United States Patent [19]

Szymczak

[11] 4,015,864
[45] Apr. 5, 1977

[54] WELL APPARATUS

[75] Inventor: Edward J. Szymczak, Spring, Tex.

[73] Assignee: Cameron Iron Works, Inc., Houston, Tex.

[22] Filed: Oct. 28, 1975

[21] Appl. No.: 626,231

[52] U.S. Cl. .......................... 285/133 A; 285/142; 285/317

[51] Int. Cl.² ........................................ F16L 39/00

[58] Field of Search .......... 285/133 R, 133 A, 142, 285/141, 140, 317, 139, 138, 143

[56] References Cited

UNITED STATES PATENTS

| | | | |
|---|---|---|---|
| 1,981,863 | 11/1934 | Harris et al. | 285/133 A |
| 3,071,396 | 1/1963 | Neilon | 285/142 X |
| 3,105,552 | 10/1963 | Haeber et al. | 285/140 X |
| 3,171,674 | 3/1965 | Bickel et al. | 285/133 A X |
| 3,268,243 | 8/1966 | Word | 285/142 |
| 3,273,915 | 9/1966 | Bishop et al. | 285/140 X |
| 3,335,799 | 8/1967 | Miller | 285/142 X |
| 3,497,243 | 2/1970 | Gruller et al. | 285/141 X |

*Primary Examiner*—Thomas F. Callaghan
*Attorney, Agent, or Firm*—W. F. Hyer; Marvin B. Eickenroht

[57] ABSTRACT

There is disclosed an assembly including a pair of tubular members for suspending inner and outer casings with the bore of an offshore well.

8 Claims, 1 Drawing Figure

U.S. Patent    April 5, 1977    4,015,864
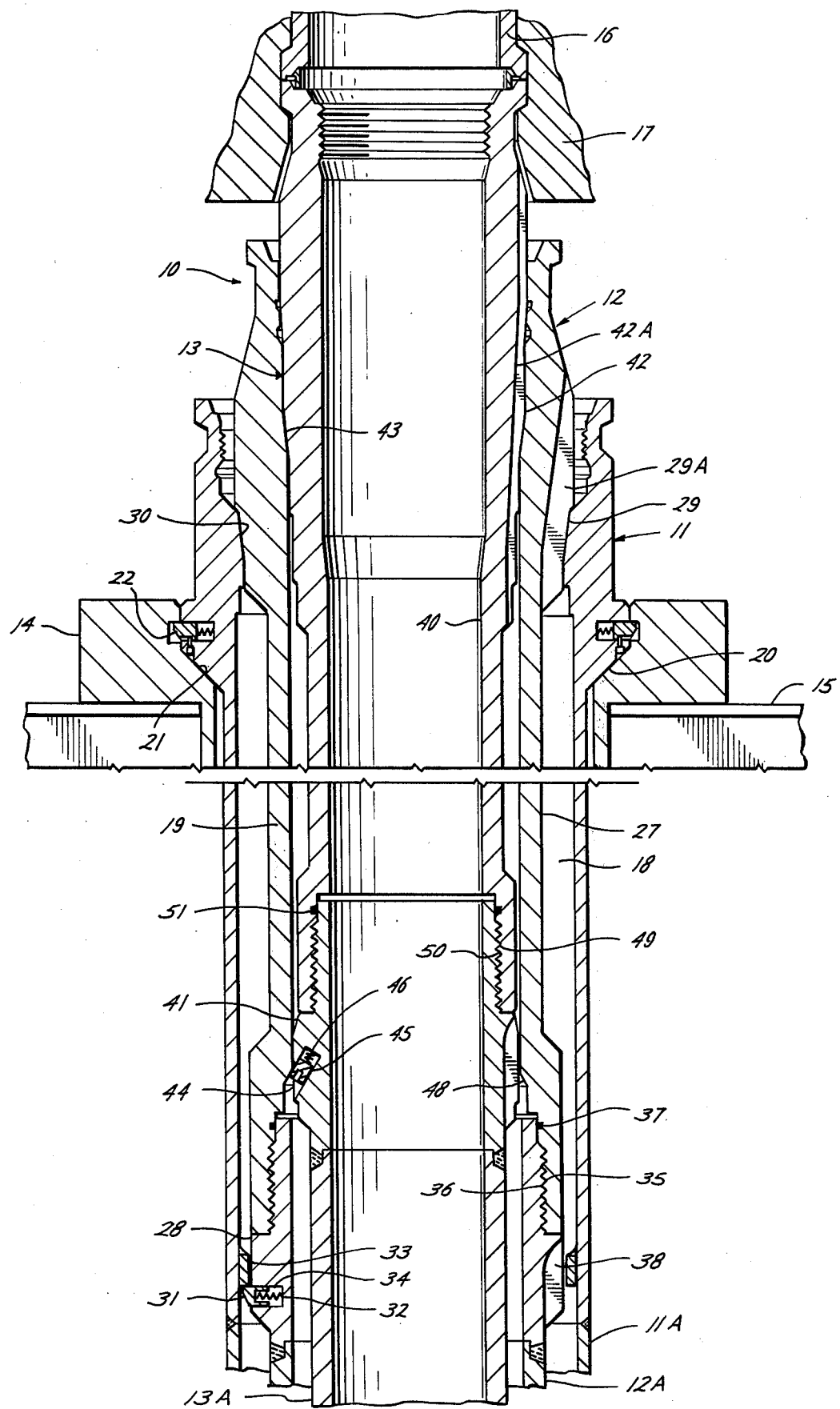

WELL APPARATUS

This invention relates generally to well apparatus; and, more particularly, to improvements in an assembly for use in suspending casing within a well at an offshore location.

In the drilling of an offshore well, successively smaller strings of casing are lowered from a drilling vessel at water level into positions concentrically within one another in order to line successively decreasing diameter portions of the well bore. As each string is lowered to the desired depth, it is supported from the next outer string by means of a tubular member on its upper end which has a downwardly facing shoulder adapted to land on an upwardly facing shoulder on a tubular member from which the upper end of the outer string is supported.

More particularly, these tubular members or housings are landed within one another at a subsurface level, and are adapted to be connected at their upper ends to riser pipes for extension upwardly to the water level. Thus, when a drill string is lowered therein to drill a further portion of the well bore, drilling mud may be circulated downwardly through the drill string and upwardly through the annular space between the drill string and the casing string and riser pipe thereabove. When the next inner casing string has been lowered into landed position within the outer string so as to line the just drilled portion of the well bore, it is anchored in place by means of cement which is circulated downwardly through the casing string and upwardly into the annular space. In offshore wells of this type, the cement returns may circulate through bypasses in the shoulder portions of one or both of the tubular members.

It is also desirable to hold each casing string down in its lowered position in order to resist upwardly directed loads due to the cement or to tension on the riser pipe. For this purpose, each pair of inner and outer tubular members may be provided with means for automatically latching the inner member against upward movement as it lands on the outer member. Preferably, the latching means comprises a downwardly facing shoulder on the inner diameter of the outer member, and a latch part on the outer diameter of the inner tubular member which is yieldably urged outwardly to latching position.

There are instances in which it is desirable to recover the assembly of tubular members, as, for example, when the well being drilled has been found to be uneconomical to produce. For this purpose, the casing strings may be severed at some point below the tubular members to permit the assembly to be lifted from the subsurface level. At this time, the bond of the cement with the members may be broken, and the members separated from one another for use at another location.

However, the disassembly procedure is difficult because of the inaccessibility of the latching means which must be unlatched in order to permit separation of the tubular members. This is further complicated by the fact that during the cementing procedure, cement gets behind the latch parts and thus interfers with moving them to unlatching position. As a result, it may be necessary to damage the assembly in the process of unlatching the latching means.

An object of this invention is to provide an assembly of this type in which the tubular members may be separated from one another without damage.

Another object is to provide such apparatus in which the tubular members may be separated without unlatching the latching means.

A further object is to provide such apparatus in which the assembly is relatively inexpensive to manufacture and in which the tubular members are easy to separate.

These and other objects are accomplished, in accordance with the illustrated embodiment of the present invention, by apparatus in which an outer (or first) tubular member supports an inner (or second) tubular member which includes upper and lower tubular sections sealably connected to one another intermediate the shoulder and the latching means on the inner member. Thus, when it is desired to separate the members, the sections of the inner member may, upon disconnection, be pulled from opposite ends of the outer member. More particularly, the landing shoulder is on the upper tubular section and the latching means is on the lower tubular section, and the connection comprises threads on the upper and lower sections of the second member, so that disconnection merely requires manipulation of the end of one section with respect to the other. Preferably, the downwardly facing shoulder is near the upper end and the latching means is near the lower end of the inner member.

In the illustrated embodiment of the invention, the latching means is disposed on an outwardly enlarged annular portion of the lower section, and bypass slots are formed in this enlarged portion to facilitate the circulation of fluid returns therethrough. As previously described, it is preferred that the latching means comprise a latch part carried by the enlarged portion, a downwardly facing latch shoulder on the inner diameter of the first or outer member, and means which yieldably urges the latch part to latching position to meet the latch shoulder.

The single FIGURE of the drawings is a vertical sectional view, interrupted intermediate its upper and lower ends, of an assembly constructed in accordance with the present invention.

With reference now to the details of the drawing, the overall assembly, which is indicated in its entirety by reference character 10, comprises an outermost tubular member 11 from which an outer casing string 11A is suspended, an intermediate tubular member 12 from which an intermediate casing string 12A is suspended, and an innermost tubular member 13 from which an innermost casing string 13A is suspended. The outermost tubular member is landed upon and supported within the bore through a housing 14 mounted upon a guide base 15 resting on the subsurface or ocean floor. The intermediate tubular member is in turn landed upon and supported within outer member 11, and in this sense, tubular member 12 is an "inner" member with respect to member 11. Finally, the innermost tubular member 13 is landed upon and supported within the intermediate member 12.

Thus in the installation of such apparatus, and with the guide base 15 resting upon the ocean floor and casing string 11A lowered into the well bore to land tubular member 11 on housing 14, the well bore may be drilled to a deeper depth, after which the casing string 12A is lowered into place and supported at a desired level within casing 11A by landing of member 12 upon member 11. Following this, the well bore is drilled to a still further depth, and casing string 13A is lowered into place and supported at a desired level within casing 12A by landing of tubular member 13 upon tubular member 12.

During the drilling of each portion of the well bore, drilling mud is circulated downwardly through the drill string and upwardly within the annulus between the drill string and casing string and a riser pipe extending upwardly from the casing string. The lower end of such a riser pipe 16 is shown in the drawing to be releasably connected to the upper end of tubular member 13 by means of a connector 17. The upper ends of members 11 and 12 have preparations similar to the upper end of the member 13 for releasable connection to riser pipes during that stage of the drilling operation in which a drill string is extended therein.

When each casing string has been lowered into place, it is anchored within the well bore by means of cement which is circulated upwardly into the annular space about its outer diameter. Thus, as shown in the drawing, there is an annular space 18 between casing strings 11A and 12A through which cement is circulated to anchor string 12A in place, and there is an annular space 19 between casing strings 12A and 13A through which cement is circulated to anchor casing string 13A in place. As will be described in detail below, each of the tubular members 12 and 13 is so constructed as to be held down in landed position during the cementing operation, and to facilitate the circulation of fluid returns therepast.

Tubular member 11 has a downwardly and inwardly tapered shoulder 20 which is landed upon a similarly shaped shoulder 21 in the bore of housing 14. When so landed, member 11 is held against upward movement by latch means 22.

Tubular member 12 includes an upper tubular section 27 and a lower tubular section 28, the upper section having a downwardly and inwardly tapered should 29 thereabout which lands upon a similarly shaped shoulder 30 within the inner diameter of tubular member 11. With tubular member 12 so landed, it extends above tubular member 11, whereby a riser pipe may be connected thereto, and downwardly to a level close to that of the lower end of tubular member 11. Bypass slots 29A are formed in shoulder 29 to permit the passage of cement returns upwardly within space 18.

Tubular member 12 is held down in landed position by latching means comprising latch parts 31 mounted within sockets 32 in enlarged outer diameter portions of member 12 for reciprocation between extended positions in which their upper edges are latched beneath a shoulder on the lower end of a ring 33 welded about the inner diameter of tubular member 11, and retracted positions in which they are withdrawn for movement past ring 33. More particularly, latch parts 31 are urged outwardly to their outer positions by means of springs 34 within sockets 32, and the lower sides of their outer ends are tapered to permit them to slide downwardly over the upper edge of the ring 33 as the tubular member 12 is lowered into landed position.

Tubular sections 27 and 28 are connected to one another intermediate the shoulder 29 and latch parts 31 by means of a pin 35 on the upper end of lower section 28 threadedly engaged with a box 36 about the lower end of upper section 27. The sections are sealed with respect to one another, when so connected, by means of a seal ring 37 carried in a groove in the upper end of the box for sealing engagement with the upper end of the pin. Bypass slots 38 are formed in the enlarged portion of the lower section 28, intermediate latch parts 31, so as to facilitate circulation of fluid returns within the annular space 18.

Tubular member 13 also comprises upper and lower tubular sections 40 and 41, with the upper section having a downwardly and inwardly tapered shoulder 42 thereabout which is landed upon a similarly shaped shoulder 43 on the inner diameter of tubular member 12. When member 13 is landed, its uppermost end extends above member 12 to permit its connection to riser piper 16, and its lowermost end extends downwardly to a level at least near the level of the lowermost end of members 11 and 12. Bypass slots 42A are formed in the tapered shoulder to facilitate the circulation of cement returns upwardly within annular space 19.

As shown, the landing shoulders 20, 29 and 42 on members 11, 12 and 13 respectively, and thus shoulders 21, 30 and 43, taper downwardly and inwardly at relatively small angles with respect to the axes of the member. In each case, however, each shoulder 20, 29 and 42 has a downwardly facing component, and thus "faces downwardly", and each shoulder 21, 30 and 43 has an upwardly facing component, and thus "faces upwardly", as those terms are used in the claims.

Tubular member 13 is held down in landed position by means of latch parts 44 which are moved into latched positions automatically in response to landing of tubular member 13. Each such latch part is slidably received within a socket 45 formed in the enlarged outer diameter portion of the lower section 41 and yieldably urged outwardly therefrom by means of a spring 46 within the socket. In their outer positions, the latch parts latch beneath a downwardly facing shoulder 48 on the inner diameter of the upper section 27. However, the latch parts 44 are adapted to be moved inwardly to permit them to move downwardly within the section 27 of the tubular member 12 as the tubular member 13 is lowered into landed position, at which time, springs 46 automatically urge them outwardly to latching position beneath shoulder 48.

Latch parts 44 differ somewhat from latch parts 22 and 31 in that they extend downwardly and outwardly, instead of radially of the axis of tubular member 13, thus minimizing the depth of sockets 45 and the thickness of the enlarged diameter portion of section 41. For this reason, latching shoulder 48 extends downwardly and outwardly to conform with the upper latching surfaces on latch parts 44. The ends of parts 44 are perpendicular to their axes so as to extend downwardly and inwardly and thus in position to be urged inwardly as member 13 is lowered into member 12.

As was also true of tubular member 12, the upper and lower sections of tubular member 13 are threadedly connected to one another by means of a pin 49 on the upper end of the enlarged portion of lower section 41, and a box 50 on an enlarged outer diameter portion on the lower end of tubular section 40. When the pin and box are connected, a seal ring 51 carried within a groove in the upper end of the box sealably engages the upper end of the pin. As was true of the tubular member 12, bypass slots 51 are formed in the enlarged portion of member 41, circumferentially intermediate latch parts 44, to facilitate the circulation of cement returns therepast.

In the event it is desired to retrieve the assembly, casing strings 11A, 12A and 13A are cut by a suitable tool or tools at a level just beneath the lowermost end of the assembly, which in this case would be just beneath the lowermost end of tubular member 12. The assembly is then lifted to the drilling vessel to permit its disassembly on board the vessel, or at any other location to which it might be delivered by the vessel. As previously described, tubular member 13 may be removed from within tubular member 12, and tubular member 12 removed from within tubular member 11, without moving the latch parts 29 and 44 to unlatching position. Thus, although it might be necessary to break the bond of any cement in the annular spaces 18 and 19, it is not necessary that all such cement be removed from within the sockets in which the latch parts are disposed. Instead, it is merely necessary to rotate the outer end of one or both of the sections of each tubular member so that the upper section thereof may be lifted from the upper end of the tubular member in which it's disposed, and the lower section thereof be moved downwardly from within the lower end of the tubular member in which it's disposed. In this manner, the integrity of each of the tubular members is maintained to permit the assembly to be used at another location.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An assembly for use in suspending casing within a well at an offshore location, comprising a first tubular member to which an outer casing may be connected for lowering into a well bore, said first member having an upwardly facing shoulder thereon, a second tubular member to which an inner casing may be connected for lowering into the well bore within the first member, said second member having a downwardly facing shoulder thereon landable on the shoulder on the first member to support the second member in spaced relation to the first member to define an annular space therebetween, and means on the inner surface of the first member and outer surface of the second member for latching the second member down against upward movement when it has been landed on the first member, said second member including an upper tubular section on which the shoulder is formed and a lower tubular section on which the latching means is provided, and means sealably connecting the tubular sections to one another intermediate the shoulder and the latching means thereon, said connecting means being disconnectible so as to permit separation of said sections while disposed within said first member.

2. An assembly for use in suspending casing within a well at an offshore location, comprising a first tubular member to which an outer casing may be connected for lowering into a well bore, said first member having an upwardly facing shoulder thereon, a second tubular member to which an inner casing may be connected for lowering into the well bore within the first member, said second member including upper and lower tubular sections, said upper section having a downwardly facing shoulder thereon landable on the shoulder on the first member to support the second member in spaced relation to the first member to define an annular space therebetween, means on the inner surface of the first member and the outer surface of the lower tubular section of the second member for latching the second member down against upward movement when it has been landed on the first member, and means sealably and threadedly connecting the tubular sections of the second member to one another intermediate the shoulder and the latching means thereon, said connecting means being disconnectible in response to rotation of an outer end of one of said sections so as to permit separation of said sections while disposed within said first member.

3. An assembly of the character defined in claim 2, wherein the shoulder is near the upper end and the latching means is near the lower end of the second member.

4. An assembly of the character defined in claim 2, wherein the lower section of the second member has an outwardly enlarged annular portion on which the latching means is disposed.

5. An assembly of the character defined in claim 4, wherein there are bypass slots which extend through said enlarged portion.

6. An assembly of the character defined in claim 4, wherein the latching means includes a latch part carried by the enlarged portion, a downwardly facing latch shoulder on the first member, and means yieldably urging the latch part to latching position beneath the latch shoulder.

7. An assembly of the character defined in claim 6, wherein there are bypass slots which extend through said enlarged portion and which are circumferentially intermediate said latch parts.

8. An assembly of the character defined in claim 2, wherein the latching means includes a latch part carried by the lower section of the second member, a downwardly facing latch shoulder on the first member, and means yieldably urging the latch part to latching position beneath the latch shoulder.

* * * * *